United States Patent [19]

Schulz

[11] Patent Number: 5,245,113
[45] Date of Patent: Sep. 14, 1993

[54] DECONTAMINATION OF PCB CONTAMINATED SOLIDS

[75] Inventor: Helmut W. Schulz, Harrison, N.Y.
[73] Assignee: Dynecology, Incorporated, Harrison, N.Y.
[21] Appl. No.: 704,803
[22] Filed: May 23, 1991
[51] Int. Cl.$^5$ .................. H01B 15/00; F23G 5/027
[52] U.S. Cl. ..................... 588/209; 423/240 R; 423/245.3; 110/346; 134/19
[58] Field of Search ............. 423/240 R, 245.3, 210, 423/DIG. 20; 208/262.5; 252/581; 110/346, 244; 585/469, 359; 134/11, 12, 14, 19; 588/209

[56] References Cited

U.S. PATENT DOCUMENTS

| | | | |
|---|---|---|---|
| 3,627,289 | 12/1971 | Erman | 134/19 |
| 4,699,667 | 10/1987 | Walsh | 134/21 |
| 4,778,606 | 10/1988 | Meenan et al. | 110/238 |
| 4,794,871 | 1/1989 | Schmidt et al. | 110/341 |
| 4,961,391 | 10/1990 | Mak et al. | 110/246 |
| 4,977,839 | 12/1990 | Fochtman et al. | 110/346 |
| 4,982,039 | 1/1991 | Benson et al. | 208/262.5 |

FOREIGN PATENT DOCUMENTS

| | | | |
|---|---|---|---|
| 284156 | 9/1988 | European Pat. Off. | 134/19 |
| 8800610 | 1/1988 | PCT Int'l Appl. | 423/245.3 |

*Primary Examiner*—Michael Lewis
*Assistant Examiner*—Peter T. DiMauro
*Attorney, Agent, or Firm*—Thomas H. Whaley

[57] ABSTRACT

A method and apparatus for removal of PCBs or similar refractory organic substances from solid surfaces, such as soil or hardware, e.g., capacitors and transformers containing a charge or residue of PCB or similar fluids. Such toxic substances are volatilized from substrates contaminated therewith by contacting them with carrier gas, such as a mixture of hydrogen, carbon monoxide and steam. The carrier gas and volatilized components are introduced into a partial oxidation zone of a gas generator where PCBs are completely destroyed at a temperature range of 2800° F. to 3500° F.

3 Claims, 2 Drawing Sheets

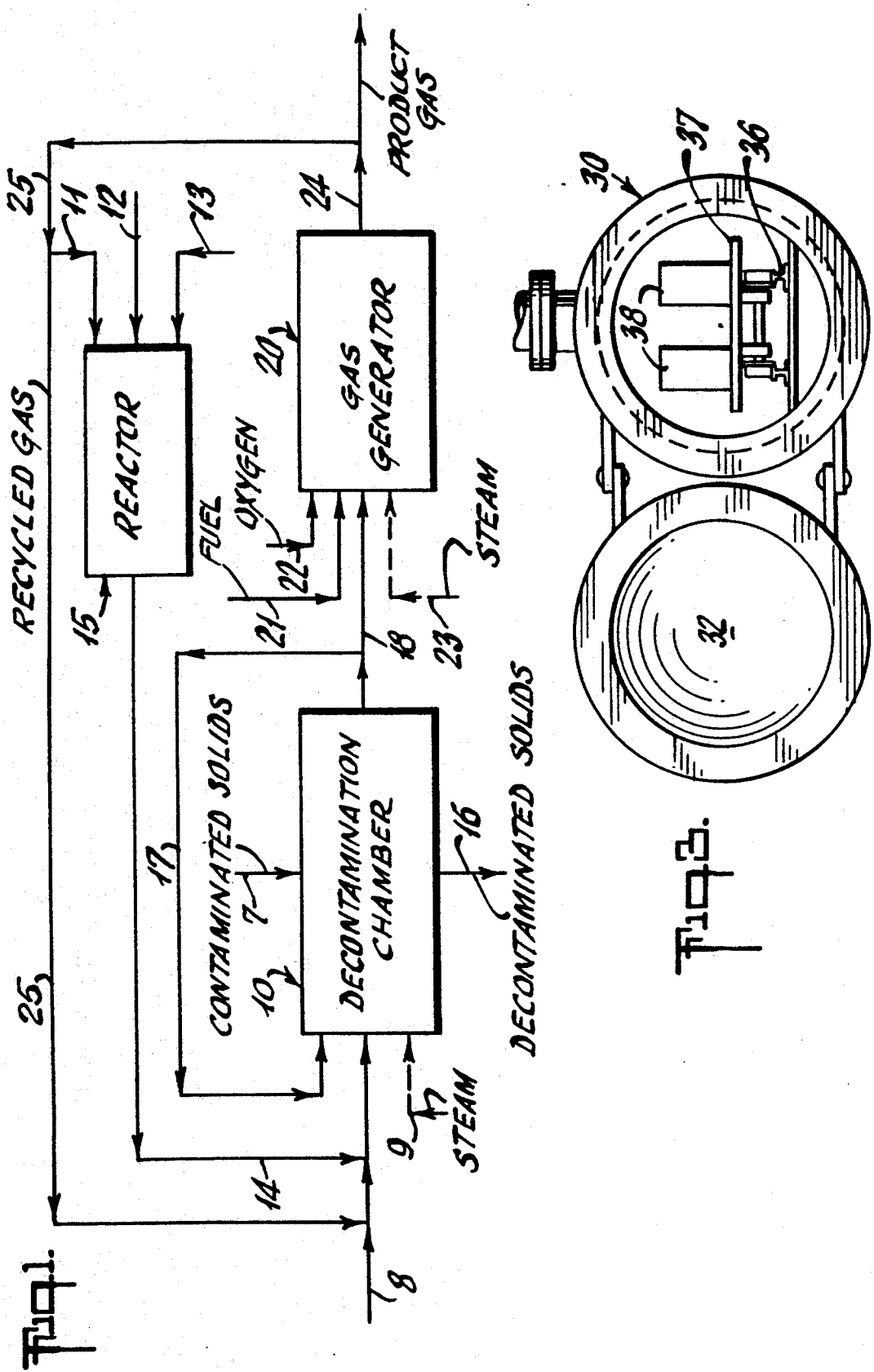

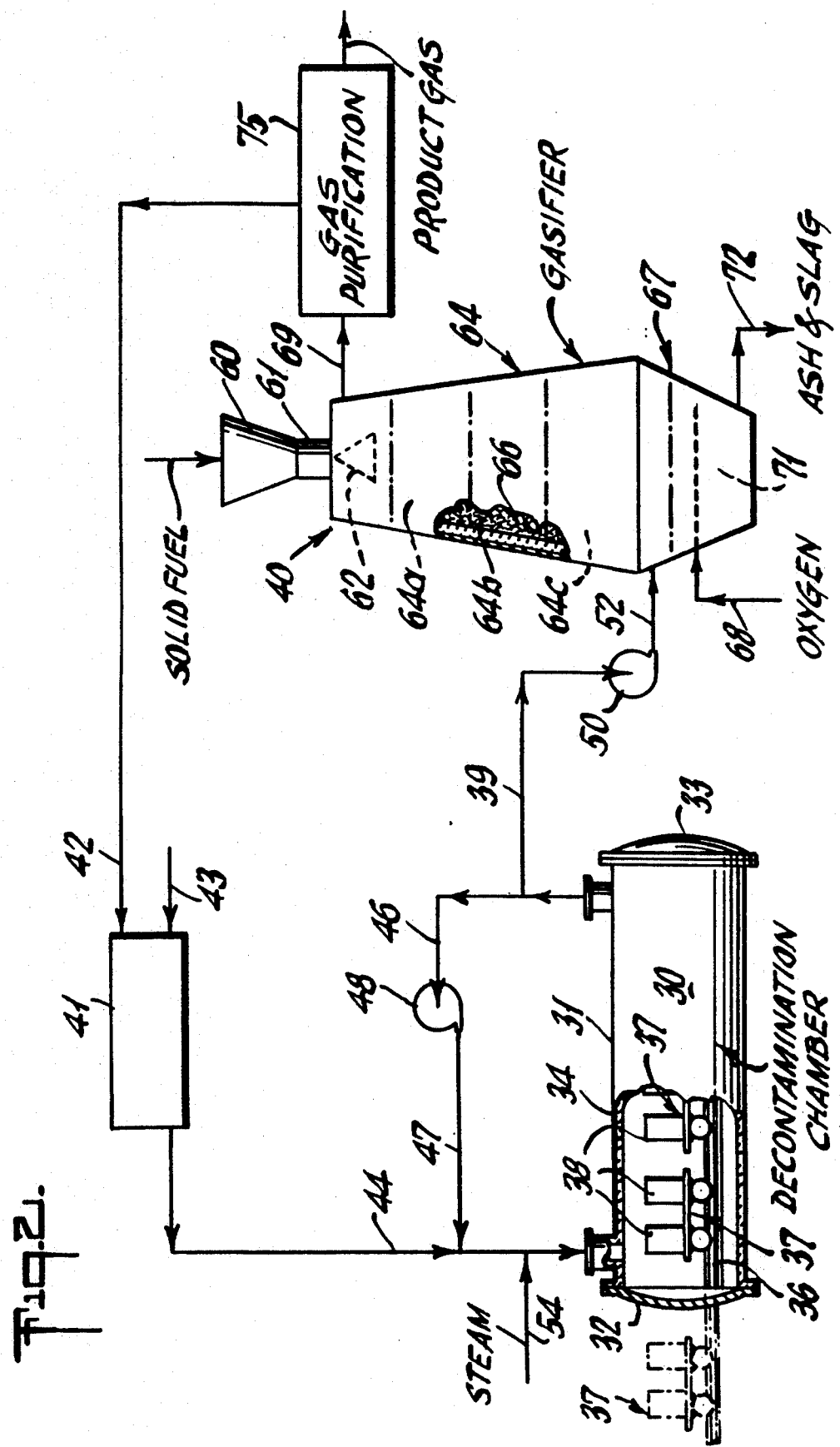

DECONTAMINATION OF PCB CONTAMINATED SOLIDS

This invention relates to a method and apparatus for removal of toxic organic materials, e.g., polychlorinated biphenyls (PCBs), from hardware. In one of its more specific aspects, this invention relates to a method for decontamination of electrical equipment containing residual PCBs. In another of its more specific aspects, this invention relates to a method for safe removal and destruction of such refractory toxic organic substances from contaminated soil or hardware with which it is associated.

The use of polychlorinated biphenyls (PCBs) as dielectric fluid in electrical equipment, such as transformers and capacitors, has been proscribed by law because of the danger of converting the toxic PCBs into still more toxic dioxins and dibenzofurans in the event of fire. Nevertheless, well over a million of such PCB-freighted devices are still in operation all over the world; the decommissioning and safe disposal of such contaminated hardware and its PCB content poses a serious environmental problem.

The process for the destruction of refractory toxic organic substances as disclosed in U.S. Pat. Nos. 4,869,731 and 4,950,309, referred to herein as the Toxiplex process, provides a highly effective means of destroying the most refractory organic substances in the form of liquids, solutions or suspensions while precluding the formation of dioxins or furans (as is frequently encountered in malfunctioning incinerators). Thus, the Toxiplex process safely destroys PCB-contaminated fluids that have been drained from transformers or capacitors.

However, the drained metal carcasses contain copper coils and insulating materials that are saturated with PCBs, at times retaining as much as 50% of the original PCB content in adsorbed or absorbed form. Such PCB contaminated hardware poses a difficult disposal problem, since the drained and steamed carcasses are considered to be a hazardous substance if they contain as little as 50 ppm of PCBs, based on the gross weight of the residual device. It is the purpose of the present invention to provide a safe and cost-effective means of decontaminating said residual devices, so that their steel, copper and other reusable components can be economically reclaimed and the remaining decontaminated materials safely disposed of.

The process of this invention comprises two distinct operations which are carried out interdependently in closed integrated fashion. The first step consists in removing and partially decomposing the PCB fluids from the substrate that holds them by adsorption, absorption, or chemical bonding. This is done by bringing a hot, carrier gas into intimate contact with the substrate structure, including the interior of said transformers or capacitors, as more fully described hereinafter.

The second step of the process consists in passing the effluent hot carrier gas from the first step (now freighted with PCBs and other devolatilization and pyrolysis products) into a reaction zone wherein the organic components of the effluent carrier gas comprising PCBs are reacted with oxygen at a temperature in the range of 2500° F. to 3500° F. In one preferred embodiment of this invention, the carrier gas effluent from the first step is passed directly into the hearth zone of an oxygen-blown gasifier of the type described in U.S. Pat. No. 4,052,173. The operation of the process of this invention will be more readily understood from the accompanying drawings and the following detailed description.

BRIEF DESCRIPTION OF DRAWINGS

FIG. 1 is a simplified flow diagram illustrating the process of this invention;

FIG. 2 is an elevational view in simplified form of apparatus suitable for carrying out the process of this invention; and FIG. 3 is an elevational end view of the apparatus of FIG. 2 for carrying out the process of this invention.

With reference to FIG. 1 of the drawings, contaminated solids, for example, soils, refuse, electrical transformers or capacitors containing residual PCBs and the like, are supplied via inlet 7 to a decontamination chamber 10. Hot carrier gas enters decontamination chamber 10 through line 8, optionally mixed with steam supplied through line 9. The hot carrier gas may be an inert gas, for example, flue gas, or a reducing gas, for example, low or medium Btu content producer gas containing methane, carbon oxides and hydrogen. Preferably, the hot carrier gas is a reducing gas from a gas generator 20 (described hereinafter) which may be supplemented by gas produced by combustion or partial combustion of fuel oil or fuel gas from lines 11 and 12 by reaction with an oxygen containing gas from line 13 in reactor 15 and supplied through line 14 to decontamination chamber 10.

Decontamination of hardware or other thermally stable solids takes place in chamber 10 by vaporization of such toxic organic compounds as may be associated therewith and sweeping their vapors away by the carrier gas. Preferably, crude or partially processed product gas from the second step of the process is employed as a principal source of carrier gas. Alternatively, the carrier gas may comprise superheated steam from an available source or gas generated on site by combustion or partial combustion of fuel oil or fuel gas with air or oxygen in reactor 15.

The decontamination chamber 10 may be operated at subatmospheric pressure, but preferably is maintained at a relatively low superatmospheric pressure, for example, 0.5 to 20 psig. The carrier gas effectively lowers the vaporization temperature required to volatilize the undesirable organic compounds at the existing operating pressure due to the partial pressure effect of the carrier gas.

Decontaminated solids are discharged from decontamination chamber through exit 16, while carrier gas and vaporized components of the charge supplied from inlet 9 are recycled to the decontamination chamber 10 through line 17 and the excess discharged through line 18.

As described herein, the process of decontamination is operated batchwise, for example as illustrated in FIGS. 2 and 3, but it will be evident that with some contaminated solids, e.g., sand, soil or particulate solid waste, it is possible to operate the decontamination chamber in a continuous manner by providing suitable lock hoppers at inlet 7 and outlet 16 in known manner. For example, the decontamination chamber may take the form of a vertical cylindrical vessel, not illustrated, with solids moving down through the vessel and gases flowing upward countercurrent to the movement of the solids, for example, in a fluid bed or Hereschoff furnace type gas-solids contactor.

Effluent gases and vapors from chamber 10 may be recycled to the decontamination chamber 10 through line 17 with part of the effluent passing through line 18 to a suitable furnace or gas generator 20 where the volatile components vaporized from the solids charged to chamber 10 are destroyed by reaction with oxygen, preferably at a temperature in the range of 2500° F. to 3200° F. The gas generator 20 preferably is of the type disclosed in my U.S. Pat. Nos. 4,052,173 or 4,950,309. Fuel, in the form of combustible solids, liquid or gas, is supplied to gas generator 20 through line 21 together with air or oxygen from line 22 in amounts sufficient to autogenously maintain the desired operating temperature in gas generator 20. If necessary or desirable, steam may be supplied to gas generator 20 through line 23 as a temperature moderator. Product gas from gas generator 20 exits the generator through line 24 from which part of the gas is passed through line 25 to line 8 as part or all of the carrier gas supply to decontamination chamber 10. The net product gas from gas generator 20 is discharged through line 24 as an available source of fuel gas or synthesis gas useful in the production of hydrogen, ammonia, alcohols, or various hydrocarbons.

FIGS. 2 and 3 illustrate a preferred embodiment of the process with suitable apparatus for carrying out the process. As illustrated, the first step is carried out in a large shaft furnace or autoclave 30 which may be a cylindrical, horizontally disposed vessel having a steel shell 31 fitted with a full diameter flanged closures 32 and 33 at one or both ends. The steel shell 31 of the vessel is well insulated with high temperature insulating material 34 to guard against the loss of heat from the walls 31 and heads 32 and 33 of the furnace to the surroundings. The interior of the furnace is preferably fitted with tracks 36 to permit easy charging and discharging of the furnace by means of wheeled charging cars 37 that carry the PCB contaminated hardware Carrier gas containing vaporized PCBs leaves the furnace through line 39.

Heat is supplied to furnace 30 by passing hot carrier gas through the full length of the furnace. In this embodiment, combustible gas from a solid fuel gasification reactor 40 is supplied to combuster 41 through line 42 where it is reacted with air or oxygen supplied through line 43 and the resulting hot gases introduced into furnace 30 through line 44 as carrier gas. Gas exiting from furnace 30 through line 39 may be recirculated through lines 46 and 47 by high-temperature turbine blower 48. The carrier gas is preferably maintained at a temperature of the order of 750° to 950° F. (400° to 500° C.) by injecting a controlled amount of hot gas from combustor 41 into the circulating gas stream from line 47 sufficient to maintain the desired furnace temperature by burning a small fraction of the combustible carrier gas. The circulating gas may consist of flue gas, hydrogen, methane, synthesis gas, or a mixture of these; it will also contain carbon dioxide and steam as some of the carrier gas is reacted with oxygen to provide the necessary heat for maintenance of the reaction temperature.

As the devolatilization and partial pyrolysis of the organic constituents of the carcasses proceeds in furnace 30, the carrier gas becomes freighted with organic devolatilization products. Carrier gas containing these products is withdrawn through line 39 and fed into the hearth of the closely coupled Toxiplex unit 40. The pressure in furnace 30 is preferably somewhat lower than the operating pressure of the gasifier 40. The pressure of gasifier 40 is preferably maintained at a modest superatmospheric pressure, e.g., in the range of 1 to 45 psig. A turbine blower 50 may be employed to blow PCB laden carrier gas from line 39 through line 52 into the hearth of gasifier 40.

In the preferred embodiment illustrated in FIGS. 2 and 3, the gas generator 40 may take the form of a shaft furnace solid fuel gasifier of the type described in detail in U.S. Pat. No. 4,052,173, incorporated herein and made a part hereof by reference. Solid carbonaceous fuel, suitably in the form of briquettes made up of a mixture of coal and organic solid waste, for example sewage sludge and municipal solid waste, is charged to a solid fuel gasifier 40 from feed bin 60 through a suitable lock hopper 61. A distributor 62 near the top of the vertical shaft 64 may be provided to distribute the solid fuel briquettes uniformly over the top of a bed 66 of solid fuel in the gasifier.

Oxygen, optionally mixed with steam as required, is introduced into the hearth zone 67 of the gasifier through supply line 68. Commercially pure oxygen containing at least 95 volume percent oxygen, preferably at least 97 percent oxygen, is preferred.

As known in the art, the solid fuel feed introduced into the top of the gasifier flows downward from the fuel inlet at the top of shaft 64 to the hearth zone 67 at the bottom of the gasifier. As the feed gravitates downward through the reactor it is contacted by hot gases flowing upward through the fuel bed from the hearth zone to exit line 69 at or near the top of shaft 64.

In the uppermost part of fuel bed 66, drying and preheating of the fuel briquettes takes place in a drying and preheating zone 64a at a temperature typically in the range of from about 200° F. to about 500° F. at the top of the bed to about 600° F. to about 900° F. at the lower part of the preheating zone. As the fuel continues its movement downward through shaft 64 it passes through a pyrolysis and coking zone 64b at a temperature range of from about 600° F. to about 900° F. at the top to a temperature range of from about 1600° F. to about 2000° F. at its lower end. In zone 64b, volatile components of the coal and other carbonizable solids are destructively distilled and pyrolized to residual coke and char.

Coke and char from the pyrolysis and coking zone 64b enter a high temperature reaction zone 64c wherein ash and other inorganic components of the solid fuel charge are fused and liquified, and collected in a pool 71 in the lower part of the hearth zone 67 from which they are tapped off through line 72. The high temperature reaction zone is maintained at a temperature in the range of from about 2000 to about 3000° F. or higher.

In the upper part of the hearth zone 67, coke and char from the pyrolysis and coking zone are gasified by partial oxidation with oxygen and steam temperature in the range of from about 2800° F. to about 3500° F. Carrier gas from furnace 30 is introduced into the hearth zone 67 through line 52, optionally in admixture with oxygen from line 68, where it contacts hot carbon at a temperature in the range of from about 2800° F. to about 3200° F. completely destroying PCBs and other halocarbons if present in the carrier gas stream. As pointed out hereinabove, the carrier gas may comprise hydrogen, nitrogen, carbon oxides, and steam or any combination thereof. Steam as required or as desired for the purpose of maintaining the temperature of the partial oxidation reaction in the upper part of hearth zone 67 in the range of 2800° F. to 3500° F. may be supplied with the oxygen through line 68 or with carrier gas through line 52.

The pressure at which the gasifier 40 is operated may be higher or lower than the pressure maintained in furnace 30. Preferably the gasification of solid fuel in gasifier 40 is carried out at a relatively low superatmospheric pressure in the range of from about 5 to about 45 psig (1.3 to 4 atmospheres absolute). Hot product gas from gasifier 40 is passed through line 69 to a gas purification system 75 wherein the gas is processed in known manner to yield the desired product fuel gas or synthesis gas for delivery through line 76.

The charging and discharging of the tubular horizontal furnace 30 are batch operations, but the degassing procedure is carried out continuously until intermittent or continuous gas analyses confirm that no more PCBs are being liberated. At that point, the flow of cycle gas from line 47 and line 44 is completely is stopped and displaced from furnace 30 by purging with steam from line 54, which also serves to cool down the furnace. Charred organic constituents remaining in the decontaminated steel carcasses may be burned out by admitting air to the furnace during the steam purge, or the charred residuals may be removed with the carcasses upon discharging them from the cooled furnace.

The preparation of the carcasses for charging to the furnace is an important part of the operation. The problem is especially severe in the case of small capacitors, which are known to retain as much as 50% of the original PCB fluid. It is necessary to disassemble, sever, or perforate them in order to insure good access of the circulating carrier gas which is intended to sweep the liberated PCBs out of the packing into the circulating gas stream. In severing or perforating the capacitors, it is important not to generate temperatures that would favor the conversion of PCBs into dioxins and dibenzofurans. The opened capacitors are then placed into the furnace cars 37 to be wheeled into the tubular furnace 30 which may be 40 to 60 feet long. Similarly, the transformers need to be opened or disassembled so that the components may be fitted into the furnace on suitably designed carriages. In the case of larger transformers, the bulk of the PCB fluids are first drained and stored in tanks for direct injection into the gasifier or gas generator where they are completely destroyed.

The duration of the degassing cycle, once the furnace has been charged, will be a function of the reaction temperatures and pressure and the rate of circulation of the carrier gas. Also, the more effective the exposure of the inner structure of the carcasses to the circulating gas stream, the shorter the time required to effectuate complete devolatilization and/or pyrolysis of the toxic organic components. The final burn-out of residual char, saturated with heavy organics, by injection of air or oxygen into the furnace is an optional feature. The combustion products of the burn-out operation may be vented through a stack, not illustrated, or they may be fed directly into the hearth of the gasifier when the latter is operated with a bed of incandescent carbon, as described in U.S. Pat. No. 4,052,173.

Capacitors or transformers decontaminated in accordance with this invention are free of adsorbed PCBs within the most stringent definitions of environmental law. Accordingly, the copper coils and steel cases may be safely shipped for recycling to copper or iron smelters. Any residual char not burned out as described above, may be safely consigned to a landfill or burned as a fuel.

I claim:

1. A process for decontamination of sealed electrical hardware capacitors and transformers containing absorbed or adsorbed polychlorinated biphenyls which comprises:
    a) opening said polychlorinated biphenyl-contaminated hardware to the atmosphere;
    b) loading said polychlorinated biphenyl-contaminated hardware into a furnace;
    c) contacting said contaminated hardware in said furnace with a stream of carrier reducing gas comprising hydrogen and carbon monoxide at a temperature in the range of 750° to 950° F. effecting vaporization of absorbed and adsorbed polychlorinated biphenyls therefrom;
    d) passing said reducing gas stream containing vaporized polychlorinated biphenyls into a partial oxidation reaction zone maintained at a temperature in the range of 2500° to 3500° F. at the point of entry of said stream;
    e) simultaneously destroying said polychlorinated biphenyls and generating a reducing gas comprising hydrogen and carbon monoxide in said reaction zone by partial oxidation of a carbonaceous fuel with oxygen and steam at an autogenous temperature in the range of 2500° to 3500° F.; and
    f) supplying reducing gas from said reaction zone to said furnace as a source of said carrier gas.

2. A process according to claim 1 wherein the reaction zone is in the hearth zone of a solid fuel gasifier wherein solid fuel is reacted with oxygen.

3. A process according to claim 1 wherein the reaction zone is an unpacked reactor wherein carbonaceous fuel is converted to reducing gas by partial oxidation with oxygen.

* * * * *